US012233532B2

(12) United States Patent
Hayashi et al.

(10) Patent No.: US 12,233,532 B2
(45) Date of Patent: Feb. 25, 2025

(54) ROBOT, AND OUTER SKIN THEREOF

(71) Applicant: GROOVE X, INC., Tokyo (JP)

(72) Inventors: Kaname Hayashi, Tokyo (JP); Minoru Koizumi, Tokyo (JP); Megumi Takada, Tokyo (JP)

(73) Assignee: GROOVE X INC., Tokyo (JP)

( * ) Notice: Subject to any disclaimer, the term of this patent is extended or adjusted under 35 U.S.C. 154(b) by 690 days.

(21) Appl. No.: 17/398,987

(22) Filed: Aug. 10, 2021

(65) Prior Publication Data

US 2021/0362345 A1 Nov. 25, 2021

Related U.S. Application Data

(63) Continuation of application No. PCT/JP2020/006516, filed on Feb. 19, 2020.

(30) Foreign Application Priority Data

Feb. 19, 2019 (JP) ................................ 2019-027070

(51) Int. Cl.
 *B25J 11/00* (2006.01)
 *B25J 19/00* (2006.01)
(52) U.S. Cl.
 CPC ........... *B25J 11/0015* (2013.01); *B25J 19/00* (2013.01)
(58) Field of Classification Search
 CPC ......... B25J 11/0015; B25J 19/00; A63H 3/36; A63H 9/00; A63H 11/00
 See application file for complete search history.

(56) References Cited

U.S. PATENT DOCUMENTS

| 4,209,939 | A | * | 7/1980 | Pittala | A63H 3/001 |
|---|---|---|---|---|---|
| | | | | | 446/295 |
| 6,565,371 | B1 | | 5/2003 | Watanabe | |
| 2004/0180603 | A1 | | 9/2004 | Barri et al. | |
| 2005/0283043 | A1 | | 12/2005 | Sisk | |
| 2018/0333862 | A1 | | 11/2018 | Hayashi | |
| 2019/0208578 | A1 | * | 7/2019 | Yamamoto | H05B 3/145 |
| 2020/0023513 | A1 | * | 1/2020 | Ha | B25J 19/0054 |
| 2020/0030707 | A1 | | 1/2020 | Hayashi et al. | |

(Continued)

FOREIGN PATENT DOCUMENTS

| CN | 1681568 A | 10/2005 |
|---|---|---|
| CN | 205627058 U | 10/2016 |
| CN | 206138737 U | 5/2017 |

(Continued)

OTHER PUBLICATIONS

Office Action in CN Application No. 202080014911.3, dated May 11, 2022, 13pp.

(Continued)

*Primary Examiner* — Kira Nguyen
(74) *Attorney, Agent, or Firm* — HAUPTMAN HAM, LLP

(57) ABSTRACT

The present invention provides a structure that is effective in providing a robot with appropriate warmth. A robot includes a frame, a surface skin that covers the frame, a heat source that heats a fluid, and a pressurizing unit that pressurizes a space enclosed by the frame. A heated fluid flows out from the space owing to the space being pressurized. A fluid layer is formed on an inner side of the surface skin covering the frame by the fluid that has flowed out from the space.

21 Claims, 10 Drawing Sheets

(56) References Cited

U.S. PATENT DOCUMENTS

2020/0406842 A1* 12/2020 Takahashi ............... H04L 12/66

FOREIGN PATENT DOCUMENTS

| | | |
|---|---|---|
| CN | 206934725 U | 1/2018 |
| CN | 207055934 U | 3/2018 |
| CN | 109847374 A | 6/2019 |
| JP | 2000323219 A | 11/2000 |
| JP | 200371775 A | 3/2003 |
| JP | 200595222 A | 4/2005 |
| JP | 2005169509 A | 6/2005 |
| JP | 2009160730 A | 7/2009 |
| WO | 2017169826 A1 | 10/2017 |
| WO | WO-2018008385 A1 * | 1/2018 ............. A63H 11/00 |
| WO | 2018190251 A1 | 10/2018 |

OTHER PUBLICATIONS

Office Action in JP Application No. 2021-502081, mailed Dec. 19, 2023. 6pp.
International Search Report in PCT/JP2020/006516, mailed May 12, 2020. 4pp.

* cited by examiner

100

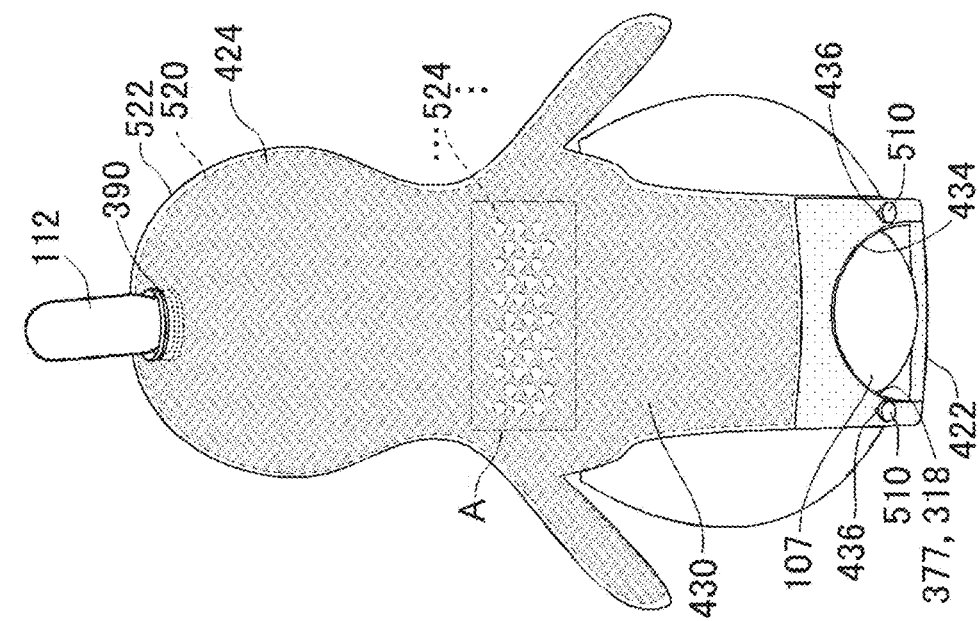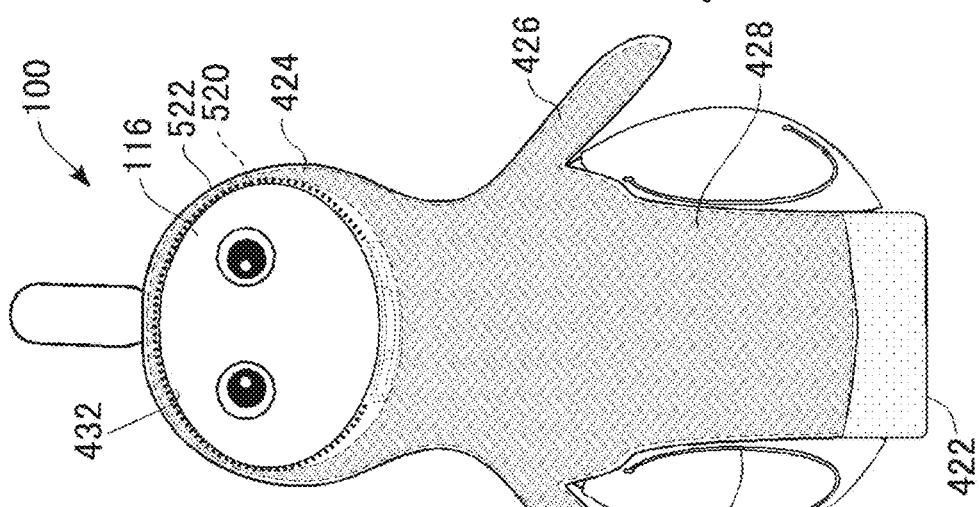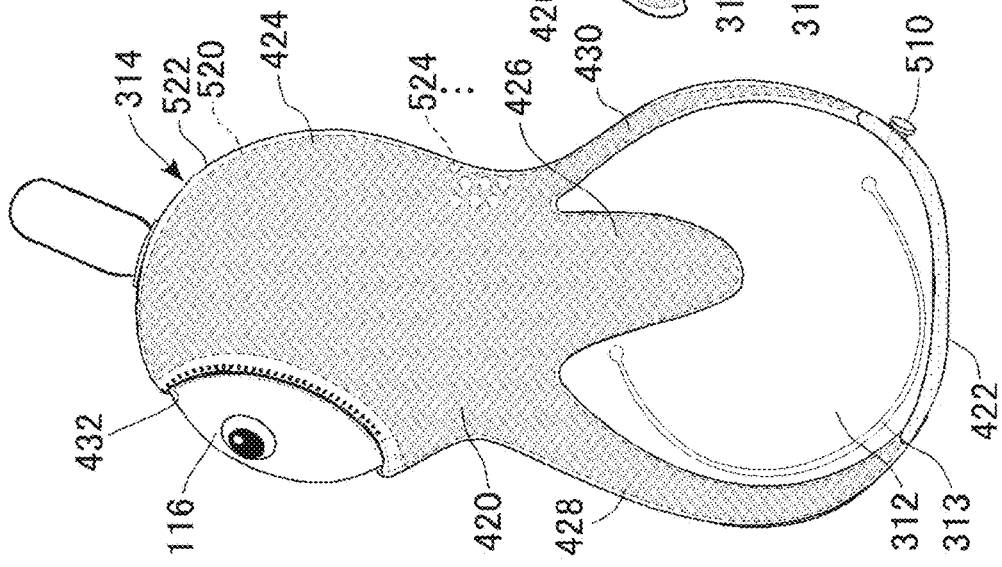

ROBOT, AND OUTER SKIN THEREOF

CROSS-REFERENCE TO RELATED APPLICATIONS

The present application is a continuation of International Application No. PCT/2020/006516, filed Feb. 19, 2020 which claims priority from Japanese Application No. 2019-027070, filed Feb. 19, 2019, the disclosures of which applications are hereby incorporated by reference herein in their entirety.

BACKGROUND OF THE INVENTION

Field of the Invention

The present invention relates to a robot, and to a structure relating to an outer skin of the robot.

Description of the Background Art

There have been advances in development of an autonomously acting robot that provides interaction and solace for a human (refer to JP-A-2000-323219). A humanoid robot, a pet robot, and the like are examples of this kind of robot. This kind of robot causes behavior to evolve by learning autonomously based on a peripheral situation, and robots that create an impression of being alive are starting to appear (refer to International Publication WO 2017/169826).

Life, however, has warmth. When an owner feels the warmth of a pet when lifting and hugging the pet, the owner may instinctively experience a feeling of security. By extension, physical contact with the pet is naturally promoted, and the owner may feel a desire to bestow affection on the pet. With regard to this, existing robots are such that emphasis is placed on an external appearance and functions that resemble those of a living being, and warmth is practically irrelevant. It is generally recognized that cooling is necessary in order to prevent overheating of internal parts, and there has been no concept of warming the robot. The inventors have arrived at the idea that providing appropriate warmth by utilizing the structure of a robot is effective in eliciting a user's affection.

SUMMARY OF THE INVENTION

The invention is an invention contrived based on a recognition of the heretofore described problem, and a main objective thereof is to provide a structure effective in providing a robot with appropriate warmth.

One aspect of the invention is a robot. The robot includes a frame, a surface skin that covers the frame, a heat source that heats a fluid, and a pressurizing unit that pressurizes a space enclosed by the frame, and forms a fluid layer on an inner side of the surface skin covering the frame by causing a heated fluid to flow out from the space.

Another aspect of the invention is also a robot. The robot includes a head portion frame, a trunk portion frame connected to the head portion frame, a surface skin placed on each frame in such a way as to cover a space between the head portion frame and the trunk portion frame, a first heat source housed in the head portion frame, a first fan that is provided in a ventilation passage passing through the first heat source and sends a fluid warmed by the first heat source to the space, a second heat source housed in the trunk portion frame, and a second fan that is provided in a ventilation passage passing through the second heat source and sends a fluid warmed by the second heat source to the space. A fluid layer is formed between each frame and the surface skin by a fluid flowing out to the space being pressurized.

Still another aspect of the invention is an outer skin that can be attached to and removed from a robot in such a way as to cover a head portion frame and a trunk portion frame. The outer skin includes a base material having thermal insulation and a fabric material that covers at least an outer surface of the base material. The base material has a communication hole that causes a space between the head portion frame and the trunk portion frame and a gap between the base material and the fabric material to communicate.

According to the invention, a body surface of a robot can be provided with an appropriate warmth.

BRIEF DESCRIPTION OF THE DRAWINGS

The heretofore described object, and other objects, characteristics, and advantages, will be further clarified by a preferred embodiment described hereafter, and by the following accompanying drawings.

FIG. 7A is a right, side view representing an external view of the robot;

FIG. 7B is a front view representing an external view of the robot;

FIG. 7C is a back view representing an external view of the robot;

DETAILED DESCRIPTION OF THE INVENTION

Figure 1A:
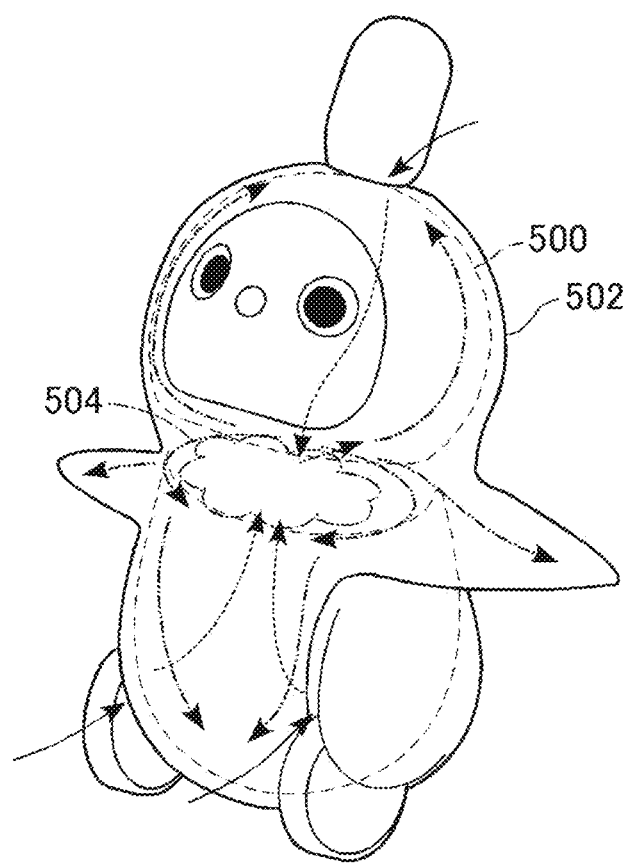
FIG. 1A is a drawing for illustrating an outline of a robot, and is a drawing representing a mechanism that warms a body surface of the robot.

Hereafter, an embodiment of the invention will be described in detail, with reference to the drawings. For the sake of convenience, a positional relationship between structures may be expressed with a state shown in the drawings as a reference in the following description. Also, in the following embodiment and modified examples thereof, the same reference signs are allotted to components that are practically identical, and a description thereof is omitted as appropriate.

Figure 1B:
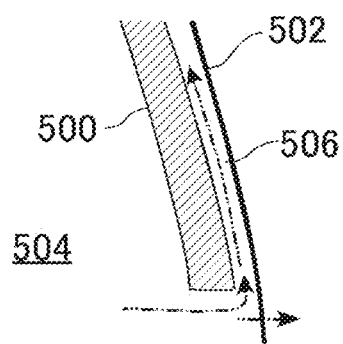
FIG. 1B is a drawing for illustrating an outline of the robot, and is a partial enlarged sectional view schematically representing a heat retention principle.

FIGS. 1A and 1B are drawings for illustrating an outline of a robot 100. FIG. 1A is a drawing representing a mechanism that warms a body surface of the robot 100. FIG. 1B is a partial enlarged sectional view schematically representing a heat retention principle.

Generally, a robot having a heat source in an interior is such that a body surface near the heat source becomes warm. However, a place distanced from the heat source, such as a physical extremity like a finger or a fingertip, does not become warm. Consequently, a body surface cannot be uniformly warmed simply by there being a heat source in the interior. A vicinity of a heat source becoming warm is an inevitable phenomenon, but there is a difference between one portion of a body surface becoming warm and uniformly warming the body surface. "Uniformly warming" here means warming in such a way that one region of the body surface is not of a predetermined temperature difference or greater in comparison with another region.

By a body surface being warmed uniformly, a person who touches a body of a robot can feel warmth without feeling that anything is strange. Because of this, a user may be provided with a feeling of wanting to proactively touch the robot. Uniformly warming a body surface of a robot encourages a user to make physical contact with the robot, and contributes to forming an attachment of the user to the robot. The robot 100 of the present embodiment is configured in consideration of the heretofore described matter.

The robot 100 maintains an appropriate temperature in a body surface. When a user touches the robot 100, the user feels exactly as though the robot 100 has a body temperature, and by extension, the user may feel the warmth of life in the robot 100. Because of this, physical contact of the user with the robot 100 is promoted, and affection from the user for the robot 100 is instinctively elicited. The warmth is realized by forming a warm air layer along the body surface by utilizing warm air that flows inside the body.

As shown in FIG. 1A, the robot 100 has a frame 500 forming a framework, and is covered with a surface skin 502 in such a way as to cover the frame 500. The surface skin 502 can be attached to and removed from the frame 500. Meanwhile, air inlets are provided in predetermined places in the frame 500, and external air is introduced as seen by referring to solid line arrows. As a heat source such as a heat generating part is provided inside the frame 500, cooling by external air is performed in order that the heat source does not overheat. Air warmed by an exchange of heat with the heat source is collected in a specific space 504 enclosed by the frame 500, as shown by dotted line arrows.

As shown in FIG. 1B, one portion of air pressurized by collecting in the space 504 passes through a fiber of the surface skin 502 and is discharged to an exterior, as shown by a dashed-and-dotted line arrow. As the surface skin 502 has ventilation resistance, however, one portion of the air is led between the frame 500 and the surface skin 502, forming an air layer 506 between the two. As warmed air is continuously introduced into the space 504, the air circulates over the whole body surface while forming the air layer 506, as shown by a dashed-and-double dotted line arrow. Because of this, an appropriate warmth is maintained in the robot 100. Hereafter, a specific configuration of this kind of robot 100 will be described.

Basic Configuration

Figure 2A:
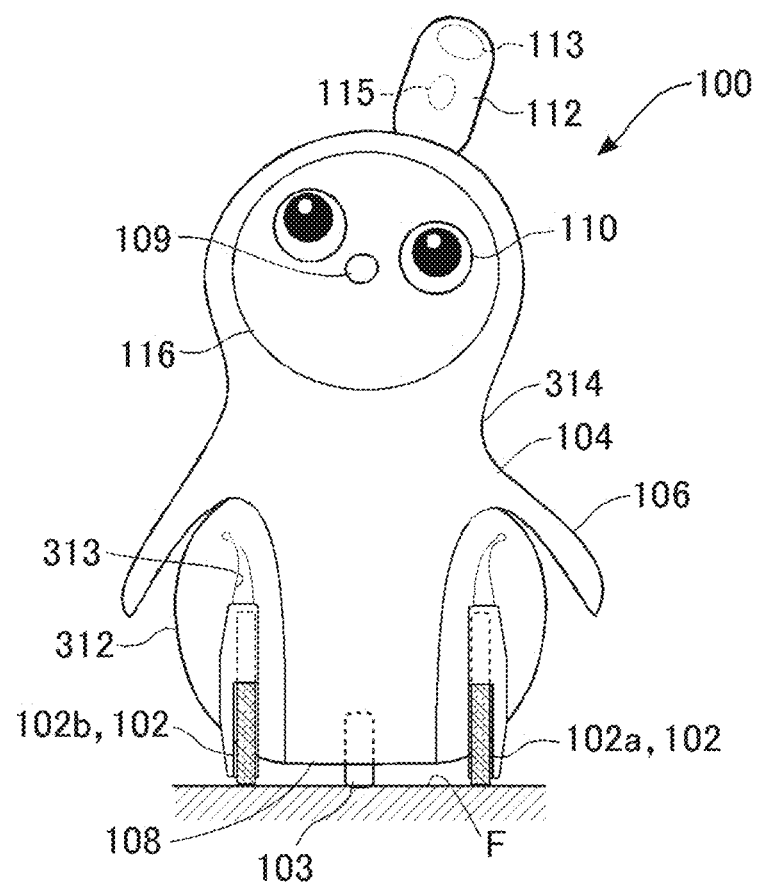
FIG. 2A is a front view representing an external view of the robot.
Figure 2B:
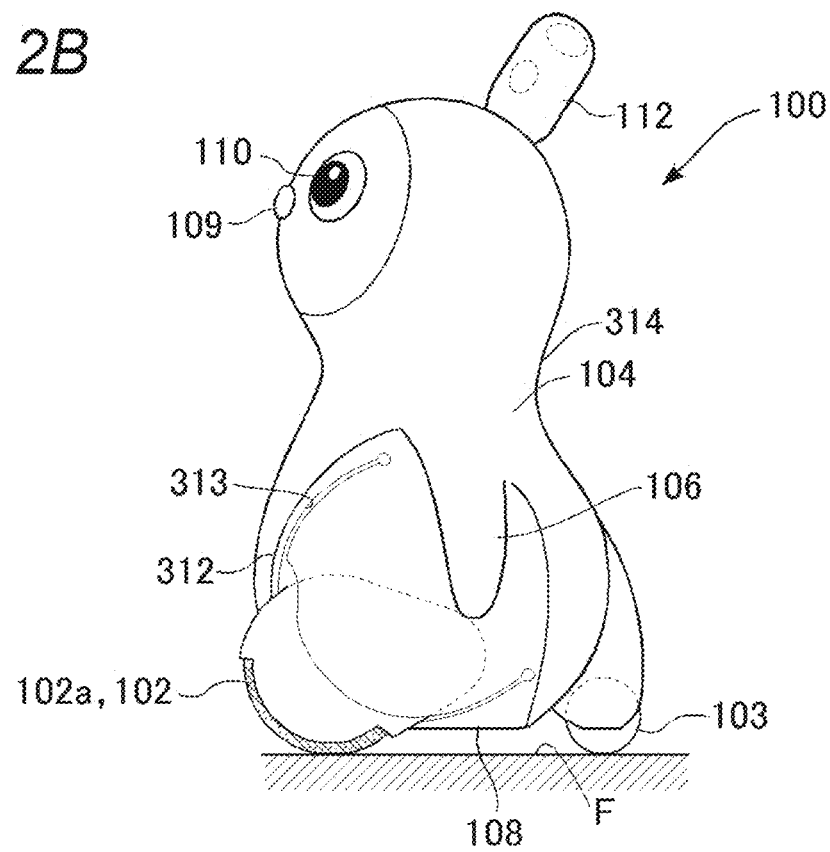
FIG. 2B is a side view representing an external view of the robot.

FIGS. 2A and 2B are drawings representing an external view of the robot 100. FIG. 2A is a front view, and FIG. 2B is a side view.

The robot 100 is an autonomously acting robot that determines what an action is to be based on an external environment and an internal state. The external environment is recognized using various kinds of sensor, such as a camera or a thermosensor. The internal state is quantified as various parameters that express emotions of the robot 100. The robot 100 has an interior of an owner's home as an action range. Hereafter, a human involved with the robot 100 will be called a "user".

A body 104 of the robot 100 has a rounded form all over, and includes an outer skin 314 formed of a soft material having elasticity, such as urethane, a rubber, a resin, or a fiber. The robot 100 may be clothed. A total weight of the robot 100 is in the region of approximately 5 to 15 kilograms, and a height is in the region of approximately 0.5 to 1.2 meters. Owing to the attributes of appropriate weight, roundness, softness, and a pleasant tactile sensation, advantages are realized in that a user finds the robot 100 easy to hold, and feels a desire to hold the robot 100.

The robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation of the left and right wheels can be individually controlled. The rear wheel 103 is a caster, and rotates freely in order to cause the robot 100 to move forward and back, and left and right. The rear wheel 103 may also be an omni wheel. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism or a linking mechanism). A left and right pair of covers 312 are provided in a lower half portion of the body 104. The covers 312 are formed of a resin material (rubber, silicone rubber, or the like) having flexibility and elasticity, configure a soft trunk, and can house the front wheels 102. A slit 313 (an aperture portion) opened from a side face to a front face is formed in the cover 312, and the front wheel 102 is caused to advance through the slit 313, whereby the front wheel 102 can be exposed to the exterior.

A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F.

The robot 100 has two arms 106. Although there is a hand at a leading end of the arm 106, there is no function of gripping an object. The arm 106 is capable of performing simple actions such as raising, bending, waving, and oscillating, using a drive of an actuator to be described hereafter. The two arms 106 can be individually controlled.

A facial region 116 is exposed in a front face of a head portion of the robot 100. Two eyes 110 are provided in the facial region 116. An image can be displayed in the eye 110 using a liquid crystal element or an organic EL element. A nose 109 is provided in a center of the facial region 116. An analog stick is provided in the nose 109, and in addition to all of up, down, left, and right directions, a pressing direction can also be detected. Also, a multiple of touch sensors are provided in the robot 100, and a touch by a user can be detected in practically all regions of the robot 100, such as the head portion, the trunk portion, a buttock portion, and the arm. Various sensors, such as a microphone array or an ultrasonic wave sensor that can identify a sound source direction, are mounted in the robot 100. Also, the robot 100 incorporates a speaker, and can emit simple speech.

A horn 112 is attached to the head portion of the robot 100. An omnidirectional camera 113 is attached to the horn 112, and can film a whole of a region above the robot 100 at one time. A thermosensor 115 (a thermal imaging camera) is also incorporated in the horn 112. An emergency stop switch is provided in the horn 112, and a user can stop the robot 100 immediately by pulling out the horn 112.

Figure 3:
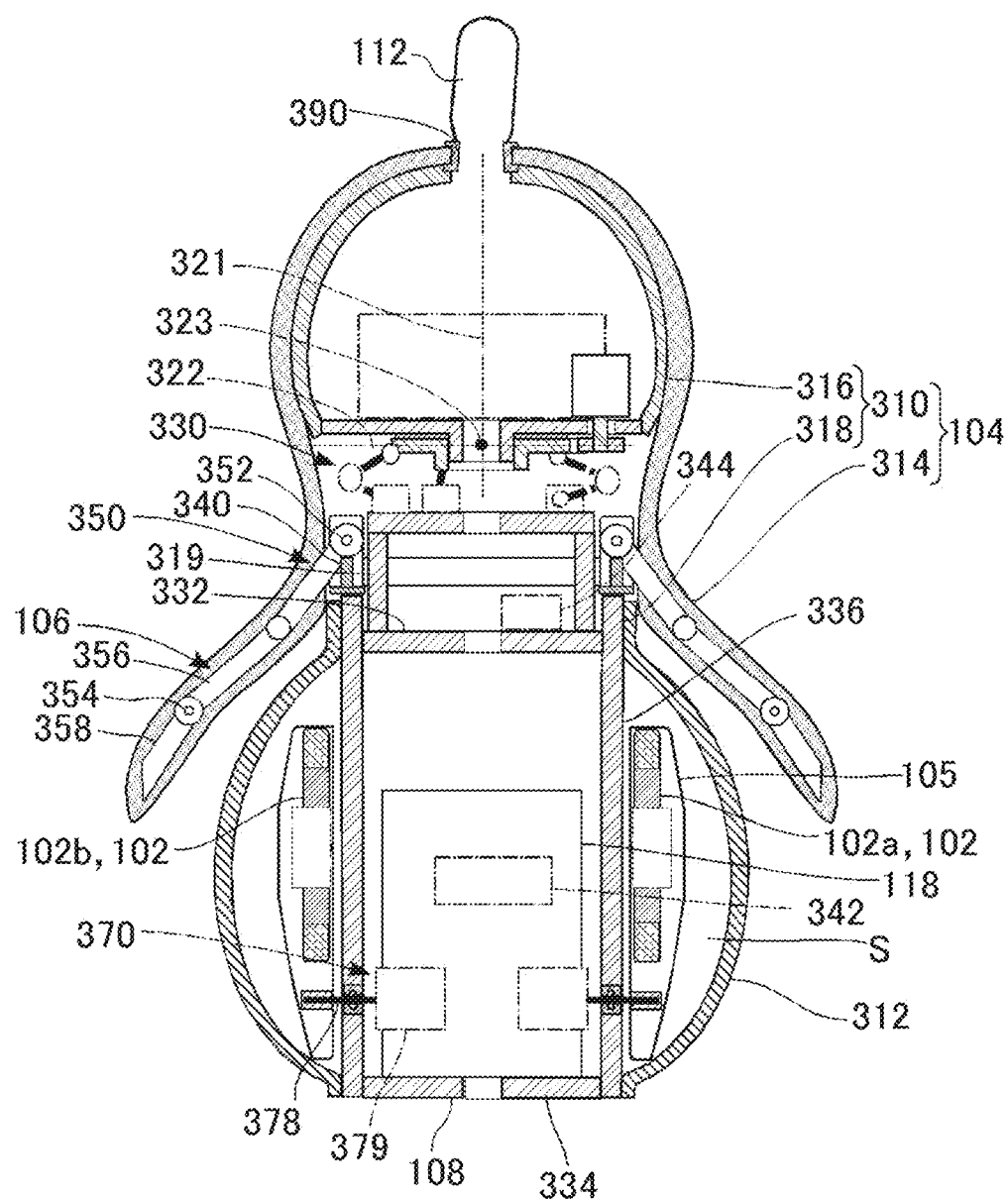
FIG. 3 is a sectional view schematically representing a structure of the robot.

FIG. 3 is a sectional view schematically representing a structure of the robot 100.

The body 104 includes a main body frame 310, the pair of arms 106, the pair of covers 312, and the outer skin 314. The main body frame 310 includes a head portion frame 316 and a trunk portion frame 318. The head portion frame 316 is of a hollow hemispherical form, and forms a head portion framework of the robot 100. The trunk portion frame 318 is of a rectangular cylindrical form, and forms a trunk portion framework of the robot 100. A lower end portion of the trunk portion frame 318 is fixed to a lower plate 334. The head portion frame 316 is connected to the trunk portion frame 318 via a connecting mechanism 330.

The trunk portion frame 318 configures an axial center of the body 104. The trunk portion frame 318 is configured by a left and right pair of side plates 336 being fixed to the lower plate 334, and supports the pair of arms 106 and an internal mechanism. A battery 118, a control circuit 342, and various kinds of actuator and the like are housed inside the trunk portion frame 318. A bottom face of the lower plate 334 forms the seating face 108.

The trunk portion 318 has an upper plate 332 in an upper portion thereof. A bottomed cylindrical support portion 319 is fixed to the upper plate 332. The upper plate 332, the lower plate 334, the pair of side plates 336, and the support portion 319 configure the trunk portion frame 318. An outer diameter of the support portion 319 is smaller than an interval between the left and right side plates 336. The pair of arms 106 configure an arm unit 350 by being assembled integrated with an annular member 340. The annular member 340 forms a circle, and the pair of arms 106 are attached in such a way as to separate in a radial direction along a central line of the annular member 340. The annular member 340 is coaxially fitted over the support portion 319, and placed on upper end faces of the pair of side plates 336. The arm unit 350 is supported from below by the trunk portion frame 318.

The head portion frame 316 has a yaw shaft 321, a pitch shaft 322, and a roll shaft 323. A head shaking action is realized by a pivoting (yawing) of the head portion frame 316 around the yaw shaft 321, a nodding action, a looking up action, and a looking down action are realized by a pivoting (pitching) around the pitch shaft 322, and an action of tilting the head left or right is realized by a pivoting (rolling) around the roll shaft 323. A position and angle of each shaft in a three-dimensional space may change in accordance with a drive aspect of the connecting mechanism 330. The connecting mechanism 330 is formed of a linking mechanism, and is driven by a multiple of motors installed in the trunk portion frame 318.

The trunk portion frame 318 houses a wheel drive mechanism 370. The wheel drive mechanism 370 includes a front wheel drive mechanism and a rear wheel drive mechanism that drive the front wheels 102 and the rear wheel 103 respectively out of and into the body 104. The front wheels 102 and the rear wheel 103 function as "movement mechanisms" that cause the robot 100 to move. The front wheel 102 has a direct drive motor in a central portion thereof. Because of this, the left wheel 102a and the right wheel 102b can be driven individually. The front wheel 102 is supported so as to be able to rotate by a wheel cover 105, and the wheel cover 105 is supported so as to be able to pivot by the trunk portion frame 318.

The pair of covers 312 are provided in such a way as to cover the trunk portion frame 318 from left and right, and are of a smooth curved form in order to provide an outline of the body 104 with roundness. A closed space is formed between the trunk portion frame 318 and the cover 312, and the closed space forms a housing space S for the front wheel 102. The rear wheel 103 is housed in a housing space provided in a lower rear of the trunk portion frame 318.

The outer skin 314 covers the main body frame 310 and the pair of arms 106 from an outer side. The outer skin 314 has a thickness of an extent such that a person feels elasticity, and is formed of a material having elasticity, such as urethane sponge. Because of this, a user feels an appropriate softness when hugging the robot 100, and can make natural physical contact, as a person does with a pet. The outer skin 314 is mounted on the main body frame 310 in an aspect such as to cause the cover 312 to be exposed. An aperture portion 390 is provided in an upper end portion of the outer skin 314. The aperture portion 390 is fitted over the horn 112. The outer skin 314 can be attached to and removed from the main body frame 310.

A touch sensor is disposed between the main body frame 310 and the outer skin 314. A touch sensor is embedded in the cover 312. Each of these touch sensors is a capacitive sensor, and a touch in practically all regions of the robot 100 is detected. A touch sensor may also be embedded in the outer skin 314, or a touch sensor may be disposed on an inner side of the main body frame 310.

The arm 106 has a first joint 352 and a second joint 354, and has an arm 356 between the two joints, and a hand 358 on a tip of the second joint 354. The first joint 352 corresponds to a shoulder joint, and the second joint 354 corresponds to a wrist joint. A motor is provided in each joint, whereby the arm 356 and the hand 358 are individually driven. A drive mechanism for driving the arm 106 includes the motors and a drive circuit 344 thereof.

Figure 4A:
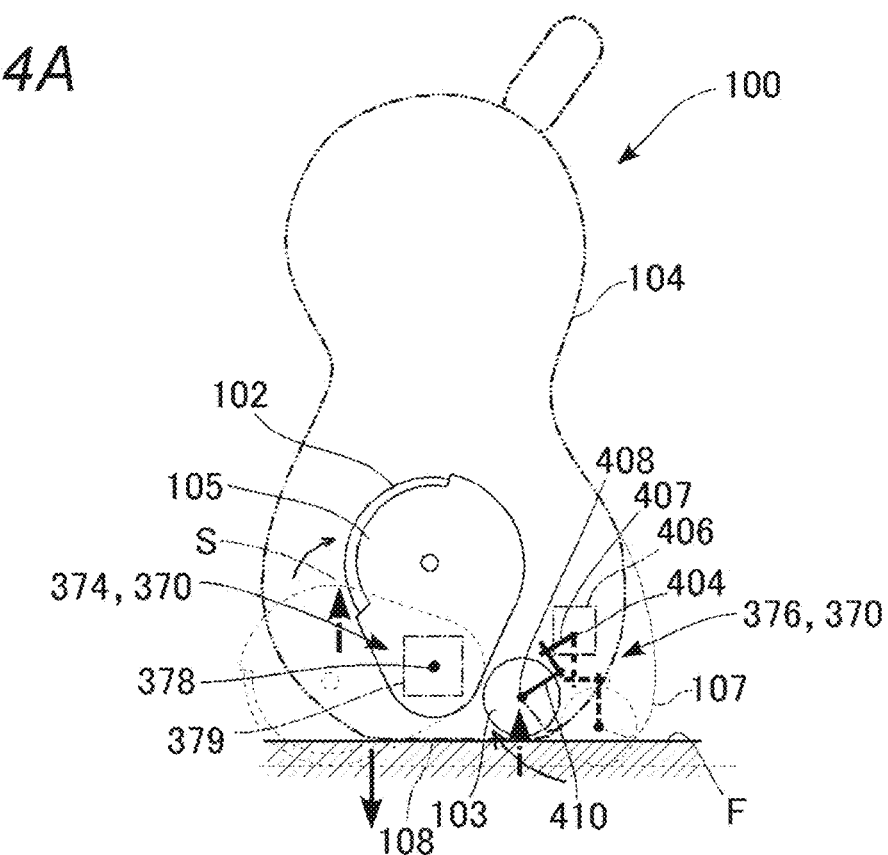
FIG. 4A is a side view schematically showing a structure and an operation of a wheel housing mechanism.
Figure 4B:
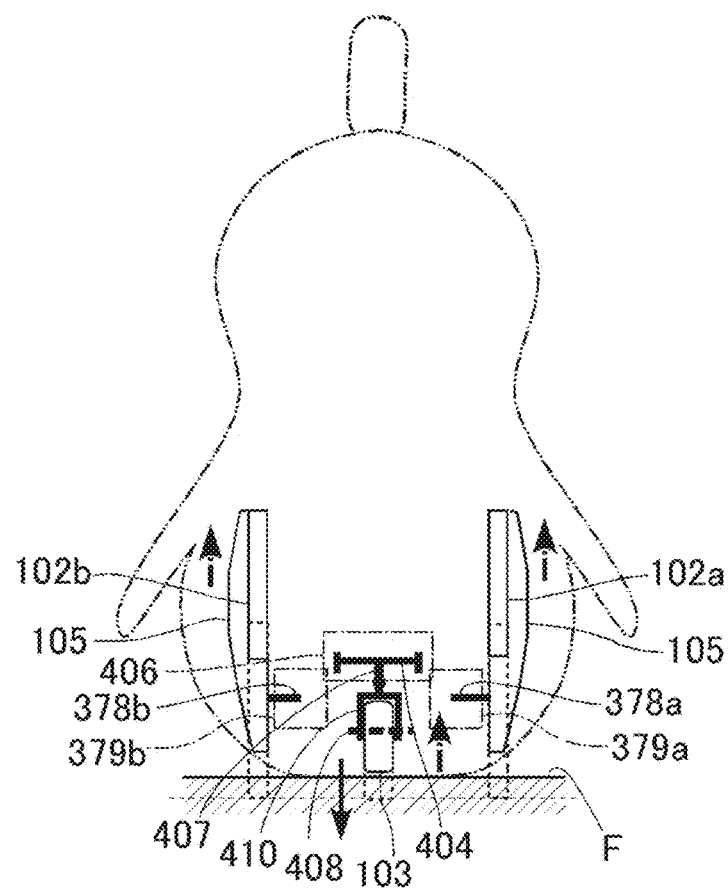
FIG. 4B is a front view schematically showing a structure and an operation of the wheel housing mechanism.

FIGS. 4A and 4B are drawings schematically showing a structure and an operation of a wheel housing mechanism. FIG. 4A is a side view, and FIG. 4B is a front view. A dotted line in the drawings indicates a state wherein a wheel has advanced from the housing space S and can travel, and a solid line in the drawing indicates a state wherein a wheel is housed in the housing space S.

The wheel drive mechanism 370 includes a front wheel drive mechanism 374 and a rear wheel drive mechanism 376. The front wheel drive mechanism 374 includes a pivot shaft 378 and an actuator 379. The pivot shaft 378 is coupled to the wheel cover 105. In the present embodiment, a motor is employed as the actuator 379. The front wheel 102 can be driven to reciprocate between the housing space S and the exterior by causing the wheel cover 105 to pivot using a drive of the actuator 379.

In the present embodiment, reciprocal drives of the left wheel 102a and the right wheel 102b can be individually controlled. That is, an actuator 379a for the left wheel 102a and an actuator 379b for the right wheel 102b are provided, and each can be independently driven. The wheel cover 105 of the left wheel 102a is connected to the actuator 379a via a pivot shaft 378a, and the wheel cover 105 of the right wheel 102b is connected to the actuator 379b via a pivot shaft 378b. In the following description, the pivot shafts 378a and 378b will be called the "pivot shaft 378" when not particularly distinguishing between the two, and the actuators 379a and 379b will be called the "actuator 379" when not particularly distinguishing between the two.

The rear wheel drive mechanism 376 includes a pivot shaft 404 and an actuator 406. The pivot shaft 404 is provided parallel with the pivot shaft 378 of the front wheel drive mechanism 374, and supports the rear wheel 103 in such a way that the rear wheel 103 can pivot around an axial line thereof. The rear wheel 103 is a caster, and has a main shaft 407 (a rotary shaft) and an axle 408. A forked arm 410 extends from the main shaft 407, and the axle 408 is provided at leading ends of the arm 410. The wheel is supported in such a way as to be able to rotate freely by the axle 408. An upper end of the main shaft 407 is connected to a center of the pivot shaft 404, and is supported in such a way as to be able to pivot freely around its own axis. The axle 408 is offset rather than being on the axial line of the main shaft 407. The main shaft 407 causes an orientation (a direction of travel) of the rear wheel 103 to change arbitrarily. The pivot shaft 404 pivots in accordance with a drive by the actuator 406, whereby the rear wheel 103 can be driven to reciprocate between a rear portion housing space and the exterior.

When housing the wheels, the actuators 379 and 406 are driven in one direction. At this time, the wheel cover 105 pivots centered on the pivot shaft 378, and the front wheel 102 rises from the floor surface F. Also, the arm 410 pivots centered on the pivot shaft 404, and the rear wheel 103 rises from the floor surface F (refer to a dashed-and-dotted line arrow). Because of this, the body 104 descends, the seating face 108 is grounded at the floor surface F (refer to a solid line arrow), and a state in which the robot 100 is sitting is realized. By the actuators 379 and 406 being driven in the opposite direction, each wheel is caused to advance, whereby the robot 100 can be caused to stand.

A rear portion cover 107 resembling a tail is provided on an outer side of the rear wheel 103, and opens and closes a rear portion lower aperture portion of the body 104 in conjunction with an advance or a withdrawal of the rear wheel 103. That is, the rear portion cover 107 operates so as to open when the rear wheel 103 is caused to advance, and the rear portion cover 107 operates so as to close when housing the rear wheel 103.

Figure 5:
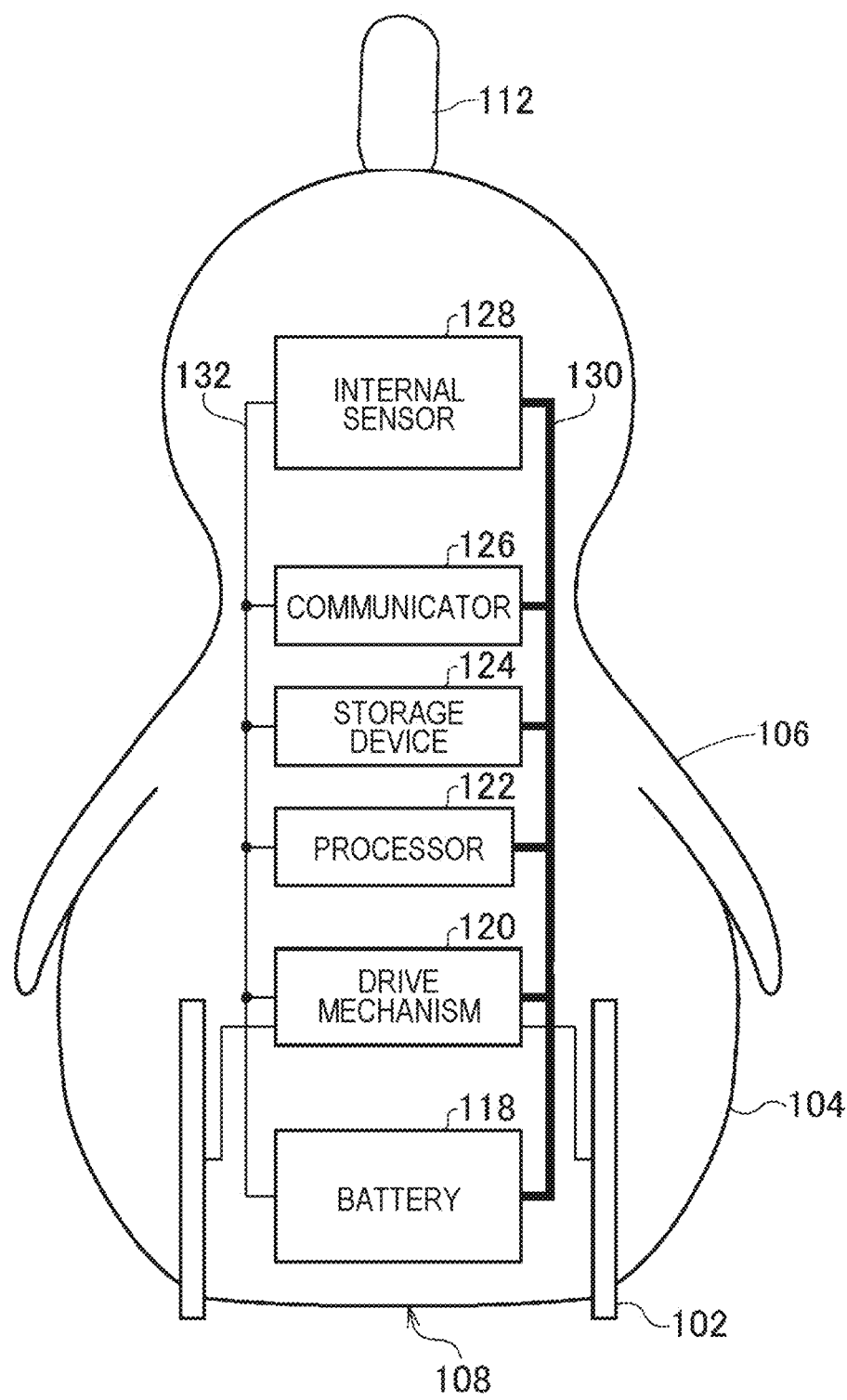
FIG. 5 is a robot hardware configuration drawing.

FIG. 5 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described connecting mechanism 330 and wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a microphone array, a distance measuring sensor (infrared sensor), a thermosensor, a touch sensor, an acceleration sensor, an air pressure sensor, a smell sensor, and the like. The touch sensor is effective in a greater portion of regions of the body 104, and detects a touch by a user based on a change in capacitance. The smell sensor is an already known sensor that applies a principle that electrical resistance changes in accordance with an adsorption of molecules that form a source of a smell.

The communicator 126 is a communication module that carries out wireless communication with various kinds of external device as a target. The storage device 124 is configured of a non-volatile memory and a volatile memory, and stores a computer program and various kinds of setting information. The processor 122 is means of executing a computer program. The drive mechanism 120 includes a multiple of actuators. In addition to this, an indicator, a speaker, and the like are also mounted.

The drive mechanism 120 mainly controls the wheels and the head portion. The drive mechanism 120 causes a direction of movement and a movement speed of the robot 100 to change, and can also cause the wheels to rise and descend. When the wheels rise, the wheels are completely housed in the body 104, and the robot 100 comes into contact with the floor surface F via the seating face 108, taking on the sitting state. Also, the drive mechanism 120 controls the arm 106.

Figure 6:
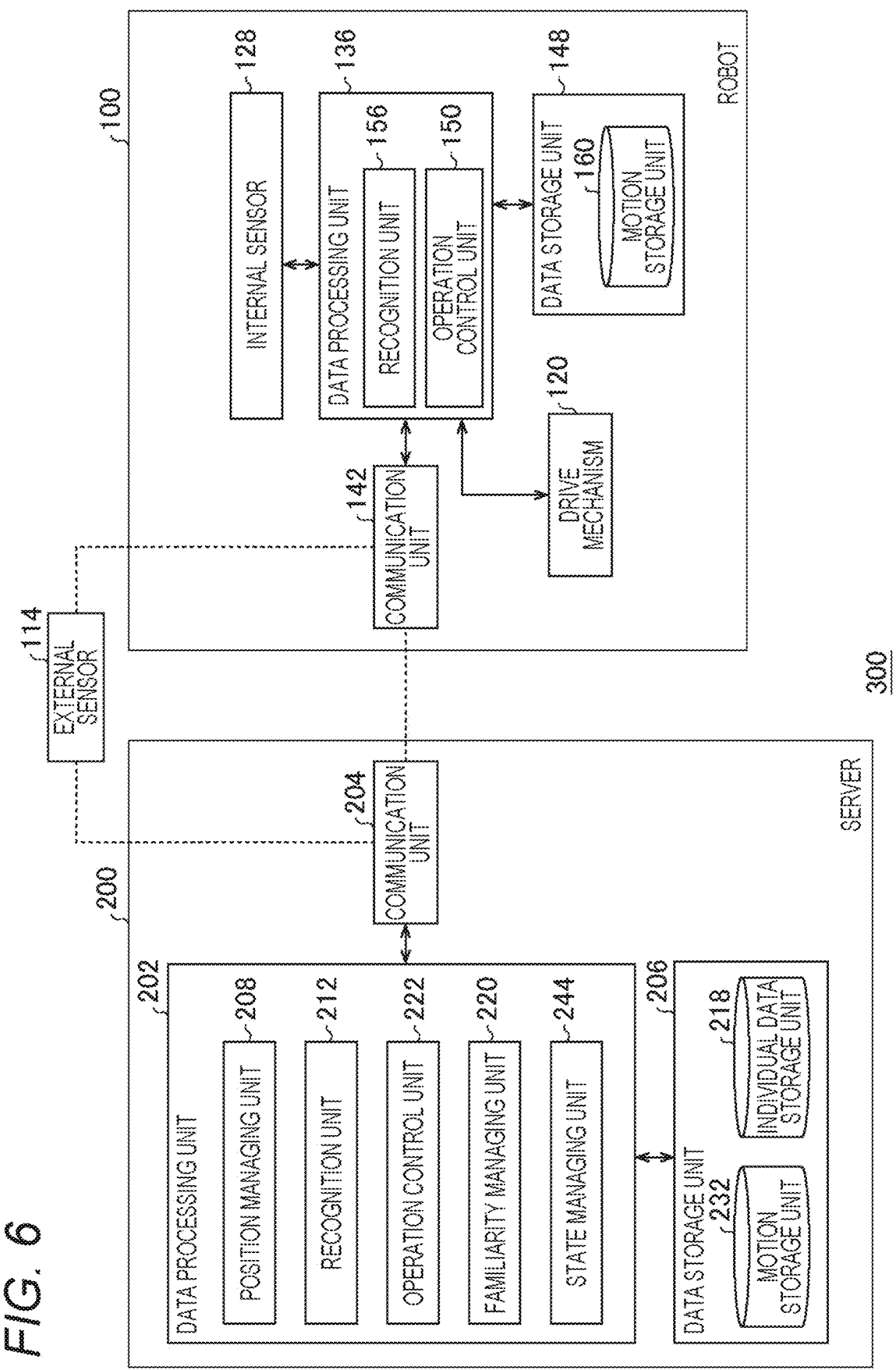
FIG. 6 is a functional block diagram of a robot system.

FIG. 6 is a functional block diagram of a robot system 300.

The robot system 300 includes the robot 100, a server 200, and a multiple of external sensors 114. Each component of the robot 100 and the server 200 is realized by hardware including a computer formed of a central processing unit (CPU), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

The multiple of external sensors 114 are installed in advance in a house. The server 200 manages the external sensor 114, and provides the robot 100 as necessary with a detected value acquired using the external sensor 114. The robot 100 determines what a basic action is to be based on information obtained from the internal sensor 128 and the multiple of external sensors 114. The external sensor 114 is for reinforcing a sensory organ of the robot 100, and the server 200 is for reinforcing a processing capacity of the robot 100. The communicator 126 of the robot 100 regularly communicates with the server 200, and the server 200 may assume responsibility for a process of identifying a position of the robot 100 using the external sensor 114 (refer to International Publication WO 2017/169826).

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface between the communication unit 204 and the data storage unit 206.

The data storage unit 206 includes a motion storage unit 232 and an individual data storage unit 218. The robot 100 has a multiple of operation patterns (motions). Various motions, such as waving the arm 106, approaching an owner while meandering, and staring at an owner with tiling the head, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100. Many motions of the robot 100 are configured as compound motions that include a multiple of unit motions.

The individual data storage unit 218 stores information regarding a user. Specifically, the individual data storage unit 218 stores familiarity with respect to a user, and master information indicating physical characteristics and behavioral characteristics of the user. The individual data storage unit 218 may also store other attribute information such as age and gender.

The robot 100 has a familiarity internal parameter for each user. When the robot 100 recognizes an action indicating a liking toward the robot 100, such as lifting and holding the robot 100 or speaking to the robot 100, familiarity with respect to that user increases. Familiarity decreases with respect to a user not involved with the robot 100, a user who behaves roughly, or a user met infrequently.

The data processing unit 202 includes a position managing unit 208, a recognition unit 212, an operation control unit 222, a familiarity managing unit 220, and a state managing unit 244. The position managing unit 208 identifies a position coordinate of the robot 100. The state managing unit 244 manages various kinds of internal parameter, such as various kinds of physical state such as a charging rate, an internal temperature, and a processing load of the processor 122. Also, the state managing unit 244 manages various kinds of emotion parameter that indicate an emotion (loneliness, curiosity, a desire for recognition, and the like) of the robot 100.

The recognition unit 212 recognizes an external environment. Various kinds of recognition, such as recognition of weather or season based on temperature and humidity, and recognition of shelter (a safe area) based on an amount of light and temperature, are included in the recognition of the external environment. A recognition unit 156 of the robot 100 acquires various kinds of environmental information using the internal sensor 128, and transmits the environmental information to the recognition unit 212 of the server 200 after carrying out a primary processing.

The recognition unit 212 determines what person a filmed user corresponds to by comparing a feature vector extracted from an image filmed by the camera incorporated in the robot 100 and a feature vector of a user (cluster) registered in advance in the individual data storage unit 218 (a user identification process). Also, the recognition unit 212 infers an emotion of a user by carrying out image recognition with respect to an expression of the user. The recognition unit 212 also carries out a user identification process with respect to a moving object other than a person, for example, a dog or a cat that is a pet.

The recognition unit 212 recognizes various responsive actions performed with respect to the robot 100, and classifies the actions as pleasant or unpleasant actions. Also, the recognition unit 212 recognizes a responsive action of an owner with respect to an action of the robot 100, thereby classifying the responsive action as a positive or negative response. Pleasant and unpleasant, actions are distinguished depending on whether a responsive action of a user is pleasing or unpleasant for a living being.

The operation control unit 222 determines what a motion of the robot 100 is to be in cooperation with an operation control unit 150 of the robot 100. The operation control unit 222 compiles a movement target point of the robot 100, and a movement route for the movement target point. The operation control unit 222 compiles a multiple of movement routes, and having done so, may select any of the movement routes. The operation control unit 222 selects a motion of the robot 100 from a multiple of motions in the motion storage unit 232.

The familiarity managing unit 220 manages familiarity for each user. Familiarity is registered as one portion of individual data in the individual data storage unit 218. When a pleasant action is detected, the familiarity managing unit 220 increases familiarity with respect to that owner. When an unpleasant action is detected, familiarity decreases. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120. The communication unit 142 corresponds to the communicator 126 (refer to FIG. 5), and manages a process of communicating with the external sensor 114, the server 200, and another robot 100. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface between the communication unit 142, the internal sensor 128, the drive mechanism 120, and the data storage unit 148.

The data storage unit 148 includes the motion storage unit 160, which defines various kinds of motion of the robot 100. Various kinds of motion file are downloaded from the motion storage unit 232 of the server 200 into the motion storage unit 160. A motion is identified by motion ID. An operating timing, an operating time, an operating direction, and the like, of the various kinds of actuator (the drive mechanism 120) are defined chronologically in a motion file in order to perform various motions, such as housing the wheels and sitting, raising the arm 106, causing the robot 100 to perform a rotating action by causing the two front wheels 102 to rotate in reverse, or by causing only one of the front wheels 102 to rotate, shaking by causing the front wheels 102 to rotate in a state wherein the wheels are housed, or stopping once and looking back when moving away from a user. Various kinds of data may also be downloaded into the data storage unit 148 from the individual data storage unit 218.

The data processing unit 136 includes the recognition unit 156 and the operation control unit 150. The recognition unit 156 analyzes external information obtained from the internal sensor 128. The recognition unit 156 is capable of visual recognition (a visual unit), smell recognition (an olfactory unit), sound recognition (an aural unit), and tactile recognition (a tactile unit).

The recognition unit 156 extracts an image region corresponding to a moving object, in particular a person or an animal, from an image, and extracts a "feature vector" as a collection of feature quantities indicating physical characteristics and behavioral characteristics of the moving object from the extracted image region. A feature vector component (feature quantity) is a numeral wherein a kind of physical or behavioral characteristic is quantified. For example, a horizontal width of a human eye is quantified in a range of 0 to 1, forming one feature vector component. A method of extracting a feature vector from a filmed image of a person is an application of already known facial recognition technology. When a moving object is detected, physical characteristics and behavioral characteristics are also extracted from a smell sensor, an incorporated highly directional microphone, a thermosensor, and the like. These characteristics are also quantified, forming a feature vector component. The recognition unit 156 identifies a user from a feature vector based on already known technology described in International Publication WO 2017/169826 and the like. The robot 100 transmits the feature vector to the server 200.

Of a series of recognition processes including detection, analysis, and determination, the recognition unit 156 carries out a selection and an extraction of information necessary for recognition, and an analytical process such as a determination is executed by the recognition unit 212 of the server 200. A recognition process may be carried out by the recognition unit 212 of the server 200 alone, or may be carried out by the recognition unit 156 of the robot 100 alone, or the two may execute the recognition process while dividing roles, as heretofore described. The robot 100 acquires an action of a user as physical information using the internal sensor 128, and the recognition unit 212 of the server 200 determines whether the action is pleasant or unpleasant. Also, the recognition unit 212 of the server 200 executes a user identification process based on a feature vector.

The recognition unit 212 of the server 200 recognizes various kinds of response by a user with respect to the robot 100. "Pleasant" or "unpleasant", and "positive" or "negative", are correlated to one portion of typical responsive actions among various kinds of responsive action. Generally, almost all responsive actions that are pleasant actions are positive reactions, and almost all responsive actions that are unpleasant actions are negative reactions. Pleasant and unpleasant actions are correlated to familiarity, and positive and negative reactions affect an action selection by the robot 100.

The familiarity managing unit 220 of the server 200 changes the familiarity toward a user in accordance with a responsive action recognized by the recognition unit 156. In principle, the familiarity toward a user who carries out a pleasant action increases, while the familiarity toward a user who carries out an unpleasant action decreases.

The operation control unit 150 determines what a motion of the robot 100 is to be in cooperation with the operation control unit 222 of the server 200. One portion of motions may be determined by the server 200, and other motions may be determined by the robot 100. Also, a configuration may be such that although the robot 100 determines what a motion is to be, the server 200 determines what a motion is to be when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 instructs the drive mechanism 120 to execute a selected motion. The drive mechanism 120 controls each actuator in accordance with a motion file.

The operation control unit 150 can also execute a motion of holding up both arms 106 as a gesture asking for "a hug" when a user with a high degree of familiarity is nearby, and can also perform a motion of no longer wanting to be hugged by causing the left and right front wheels 102 to alternately and repeatedly rotate in reverse and stop in a housed state when bored of the "hug". The drive mechanism 120 causes the robot 100 to perform various motions by driving the front wheels 102, the arm 106, and the head portion (the head portion frame 316) in accordance with an instruction from the operation control unit 150.

Next, an implementation of the robot 100 in the present embodiment will be described, with the heretofore described basic configuration as a precondition. Hereafter, a description will be given centered particularly on differences from the basic configuration.

FIGS. 7A to 7C are drawings representing an external appearance of the robot 100. FIG. 7A is a right side view, FIG. 7B is a front view, and FIG. 7C is a back view. The external appearance of the robot 100 has practically bilateral symmetry. The frame of the robot 100 (the main body frame 310; refer to FIG. 3) is a framework structure provided on an inner side of the outer skin 314, and includes a portion that forms the external appearance of the robot 100 by coming into close contact with the outer skin 314.

A housing port 377 for housing the rear wheel 103 is provided in a lower rear portion of the trunk portion frame 318 in the robot 100. A pair of charging terminals 510 are disposed protruding one each on the left and right of the housing port 377. The charging terminal 510 is of a stepped cylindrical form, and receives power by being connected to a power supply terminal of an unshown charging station. A base end of the charging terminal 510 is positioned in an interior of the trunk portion frame 318, and is connected to a charging circuit, and by extension the battery 118, via wiring. A leading end of the charging terminal 510 is of a disc form with a slightly large diameter, and resembles a button.

The outer skin 314 is configured by an outer skin main body 420 and an elastic mounting portion 422 being sewn together. The outer skin main body 420 and the elastic mounting portion 422 may be configured integrally. The outer skin main body 420 and the elastic mounting portion 422 are both formed of a material that is more flexible than the frame. The outer skin main body 420 includes a base material 520 having elasticity, and a fabric bag 522 that houses the base material 520. The base material 520 is formed of a material having elasticity, such as urethane sponge (a porous material). The base material 520 includes an insulating material. The fabric bag 522 is such that a fabric material that is smooth to the touch and has elasticity, such as polyester, is sewn into a bag form. The outer skin main body 420 includes a bag-form portion 424 covering the head portion frame 316, a pair of hand portions 426 extending downward from left and right side faces of the bag-form portion 424, a front extended portion 428 extending downward from a front face of the bag-form portion 424, and a rear extended portion 430 extending downward from a back face of the bag-form portion 424. An aperture portion 432 for causing the facial region 116 to be exposed is provided in the front face side of the bag-form portion 424. Although a flexible material having elasticity in this way is preferred as the material of the outer skin 314, it is sufficient that the material at least has flexibility.

The elastic mounting portion 422 configures a bottom portion of the outer skin 314, and links the front extended portion 428 and the rear extended portion 430 of the outer skin main body 420 from below. An aperture portion 434 is provided in a position corresponding to the housing port 377 in the elastic mounting portion 422. A pair of holes 436 are formed in a lower rear portion of the elastic mounting portion 422. The hole 436 is a hole of a small-width form like a buttonhole, but as the elastic mounting portion 422 is flexible, the hole 436 can be expanded in a width direction. One each of the pair of charging terminals 510 is inserted through the holes 436. A longitudinal direction length of the hole 436 is formed to be greater than a diameter of a leading end portion (wide diameter portion) of the charging terminal 510, and a lateral direction length of the hole 436 is smaller than the diameter of the leading end portion of the charging terminal 510. After the charging terminal 510 is inserted through the hole 436, the hole 436 returns to the original small-width form owing to an elastic force. Because of this, a head portion of the charging terminal 510 catches on a periphery of the hole 436, whereby the outer skin 314 can be prevented from deviating with respect to the frame. That is, the charging terminal 510 is a terminal for charging, and is also a member for preventing or reducing deviation of the outer skin 314.

The base material 520 is configured to include a flame-retardant material (for example, a flame-retardant sponge) that discharges a self-extinguishing gas when a temperature of a predetermined temperature threshold or greater is reached. That is, the outer skin main body 420 is formed in such a way that the flame-retardant base material 520 is enveloped in the fabric bag 522, meaning that even when the fabric bag 522 reaches a predetermined temperature or greater, the self-extinguishing gas is discharged from the base material 520, and combustion or a spread of fire in the fabric bag 522 can be prevented. The threshold temperature when the base material 520 causes the self-extinguishing gas to be generated is preferably lower than an ignition temperature of the fabric material of the fabric bag 522. In this case, even when the temperature of the fabric material of the fabric bag 522 rises, the self-extinguishing gas is generated before the fabric material of the fabric bag 522 ignites, because of which ignition of the fabric bag 522 can be prevented. As the outer skin main body 420 is configured of the flame-retardant base material 520 and the fabric bag 522 holding warm air on an outer side of the base material 520, a balance can be maintained between warmth when touching the robot 100 and safety at a high temperature.

The outer skin main body 420 has a ventilation structure for causing warm air to flow out to a back face side (portion A of FIG. 7C). The ventilation structure includes a porous structure wherein a multiple of communication holes 524 are arrayed in a predetermined region of the base material 520.

Figure 8A:
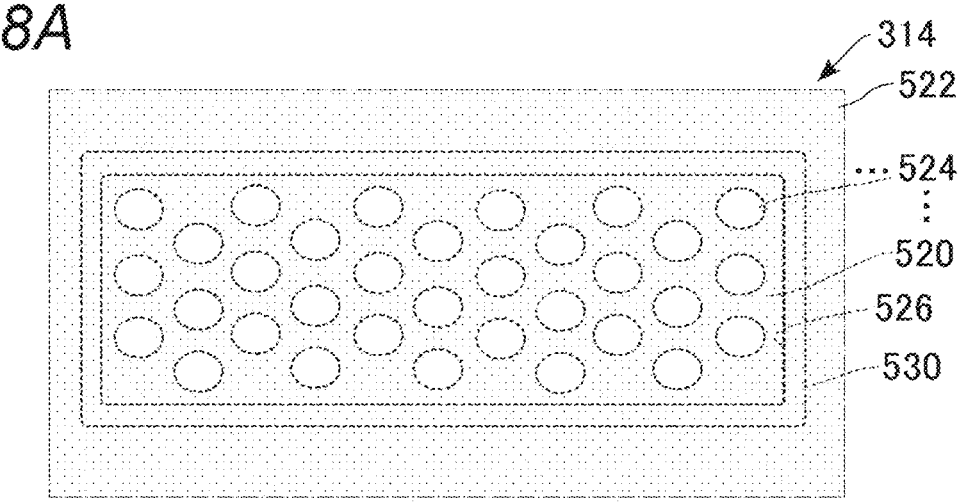
FIG. 8A is a partial enlarged view showing a main portion of a ventilation structure, and is an enlarged view of a portion A of FIG. 7C.
Figure 8B:
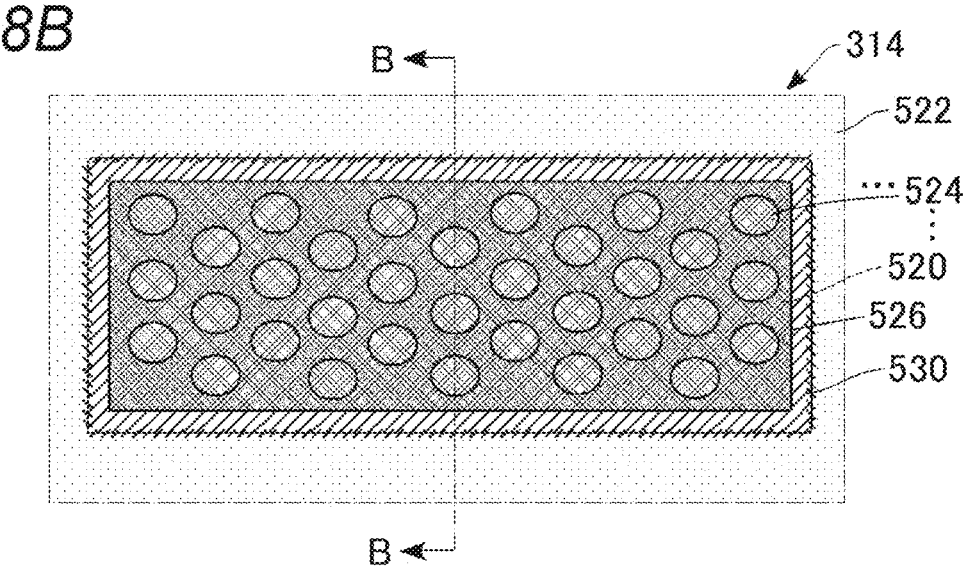
FIG. 8B is a partial enlarged view showing a main portion of the ventilation structure, and shows a side face opposite to that of FIG. 8A, that is, an inner side face of an outer skin.
Figure 8C:
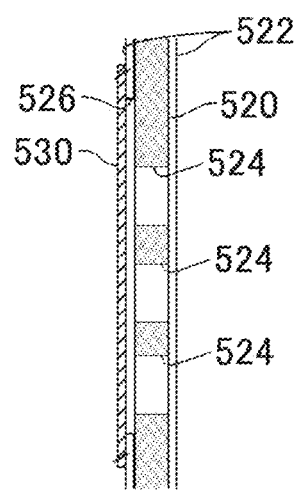
FIG. 8C is a sectional view seen along a B-B arrow of FIG. 8B.

FIGS. 8A to 8C are partial enlarged views showing a main portion of the ventilation structure. FIG. 8A is an enlarged view of the portion A of FIG. 7C. FIG. 8B shows a side face opposite to that of FIG. 8A, that is, an inner side face of the outer skin 314. FIG. 8C is a sectional view seen along a B-B arrow of FIG. 8B.

As shown in FIGS. 8A and 8B, the communication holes 524 are arrayed vertically and horizontally in a predetermined region of the base material 520, forming a porous structure. The communication hole 524 is a circular hole, and is sufficiently bigger than an air hole of the fabric bag 522. The porous structure has a ventilation resistance lower than a ventilation resistance of the fabric bag 522 in a portion of the base material 520, and functions as a "low ventilation resistance region" and a "low passage resistance region" of the invention. The low ventilation resistance region, not being limited to the form, size, disposition, and the like of the communication holes 524 shown in the drawings, can be selected as appropriate provided that the ventilation resistance is lower than that of the fabric bag 522.

As shown in FIGS. 8B and 8C, an aperture portion 526 is provided in a position corresponding to the low ventilation resistance region in an inner side face of the fabric bag 522, and a patch fabric 530 is attached by sewing in such a way as to cover the aperture portion 526. The patch fabric 530 has a mesh material, and a size of the mesh is smaller than that of the communication hole 524, and sufficiently larger than that of an air hole of the fabric bag 522. The patch fabric 530 protects the base material 520 from the inner side, and ensures a breathability of the low ventilation resistance region. By the patch fabric 530 being attached by sewing to the fabric bag 522 in this way, deformation of the aperture portion 526 is prevented or restricted, and the form of the outer skin 314 is maintained.

Figure 9:
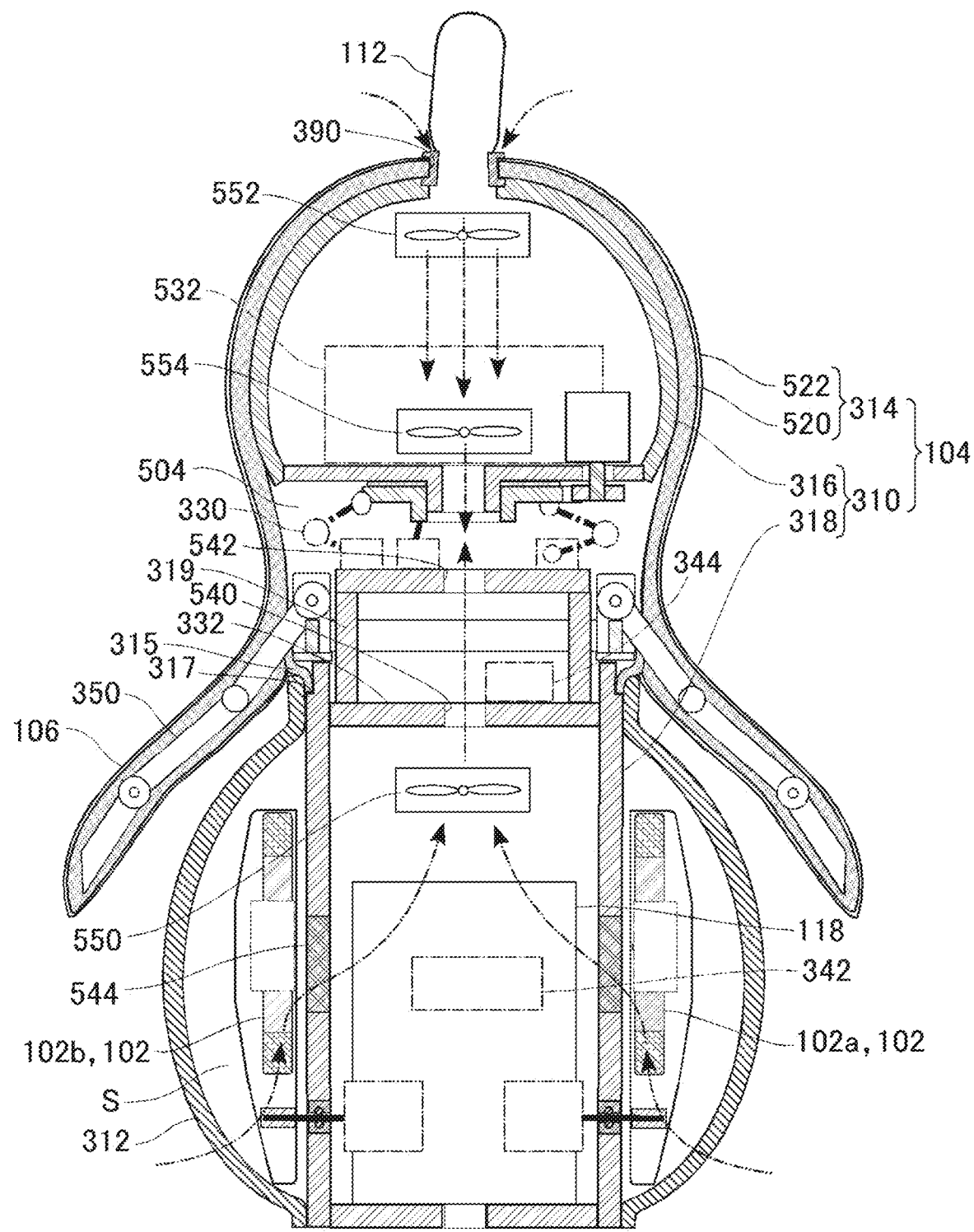
FIG. 9 is a sectional view representing a structure of the robot.

FIG. 9 is a sectional view representing a structure of the robot 100.

In the robot 100, the main body frame 310 functions as the frame 500 (refer to FIGS. 1A and 1B). The robot 100 has the space 504 between the head portion frame 316 and the trunk portion frame 318. The outer skin 314 covers the main body frame 310 in such a way as to form the space 504 inside. That is, the inner side face of the outer skin 314 is exposed to the space 504.

A circular inner skin 315 is provided integrated with the outer skin 314 in a vicinity of a base end of the arm 106. The inner skin 315 is formed of a fabric material of greater elasticity than the fabric bag 522, which is a component of the outer skin 314, and is attached by sewing to the fabric bag 522 along an underarm position of the robot 100. A lower end peripheral edge portion of the inner skin 315 is fitted and fixed in a circular groove 317 formed between the trunk portion frame 318 and the cover 312. Specifically, a gathering portion is sewn around a lower end aperture portion of the inner skin 315. A string omitted from the drawings is passed through the gathering portion, the lower end aperture portion of the inner skin 315 is closed by the string reaching a tightened state, and the lower end aperture portion of the inner skin 315 is fixed in the circular groove 317. Although the inner skin 315 stretches when the robot 100 raises the arm 106, and contracts when the robot 100 lowers the arm 106, the fixed state of the lower end portion of the inner skin 315 is maintained. Because of this, warmed air is prevented from flowing out from the lower end aperture portion of the inner skin 315, regardless of an operation of the arm 106.

Not being limited to the inner skin 315, a portion of the outer skin 314 applied to a movable region is preferably configured to be thinner than another portion of the outer skin 314, in order to ensure movability. When a portion is configured to be thin, however, a tactile sensation when touching that portion tends to be harder than that of another portion, and heat may be more likely to be discharged from the thinner portion than from another portion. In order to avoid these kinds of issue, a portion of the outer skin 314 applied to a movable region is preferably configured of a material with greater elasticity than that of another portion, and having greater thermal insulation than another portion.

A communication hole 540 that causes the inside of the trunk portion frame 318 and the inside of the support portion 319 to communicate is provided in a center of the upper plate 332. A communication hole 542 that causes the inside of the support portion 319 and the space 504 to communicate is provided in a bottom portion center of the support portion 319. A ventilation hole 544 is provided in left and right side portions of the trunk portion frame 318, and a dustproof filter is attached to each ventilation hole 544. A mesh size of the filter is set to be of an extent such that a dustproofing function can be fulfilled without impeding ventilation. A fan 550 is disposed immediately below the communication hole 540.

The fan 550 is driven while the robot 100 is operating, and cooling by ventilation is carried out. That is, external air is taken into the trunk portion frame 318 by the fan 550 being driven. The external air is introduced into the cover 312 through the slit 313 shown in FIGS. 7A to 7C, and furthermore, introduced into the trunk portion frame 318 through the ventilation hole 544 (refer to dashed-double dotted line arrows). Because of this, electrical parts that are heat generating parts disposed in the trunk portion frame 318, such as the battery 118, the control circuit 342, and the actuators, are cooled. The fan 550 sends air warmed by a heat exchange caused by the cooling upward as warm air. The air is discharged to the space 504 through the communication holes 540 and 542. That is, the ventilation hole 544 functions as an "air inlet", and the communication holes 540 and 542 function as "air outlets".

Meanwhile, a multiple of control circuit substrates 532 are disposed in an interior of the head portion frame 316, forming a factor in heat generation. Therefore, an air inlet is provided in an apex portion and an air outlet is provided in a lower portion, and an intake fan 552 and an exhaust fan 554 are provided in a passage connecting the air inlet and the air outlet, whereby cooling by external air is carried out (refer to dashed-double dotted line arrows).

Figure 10A:
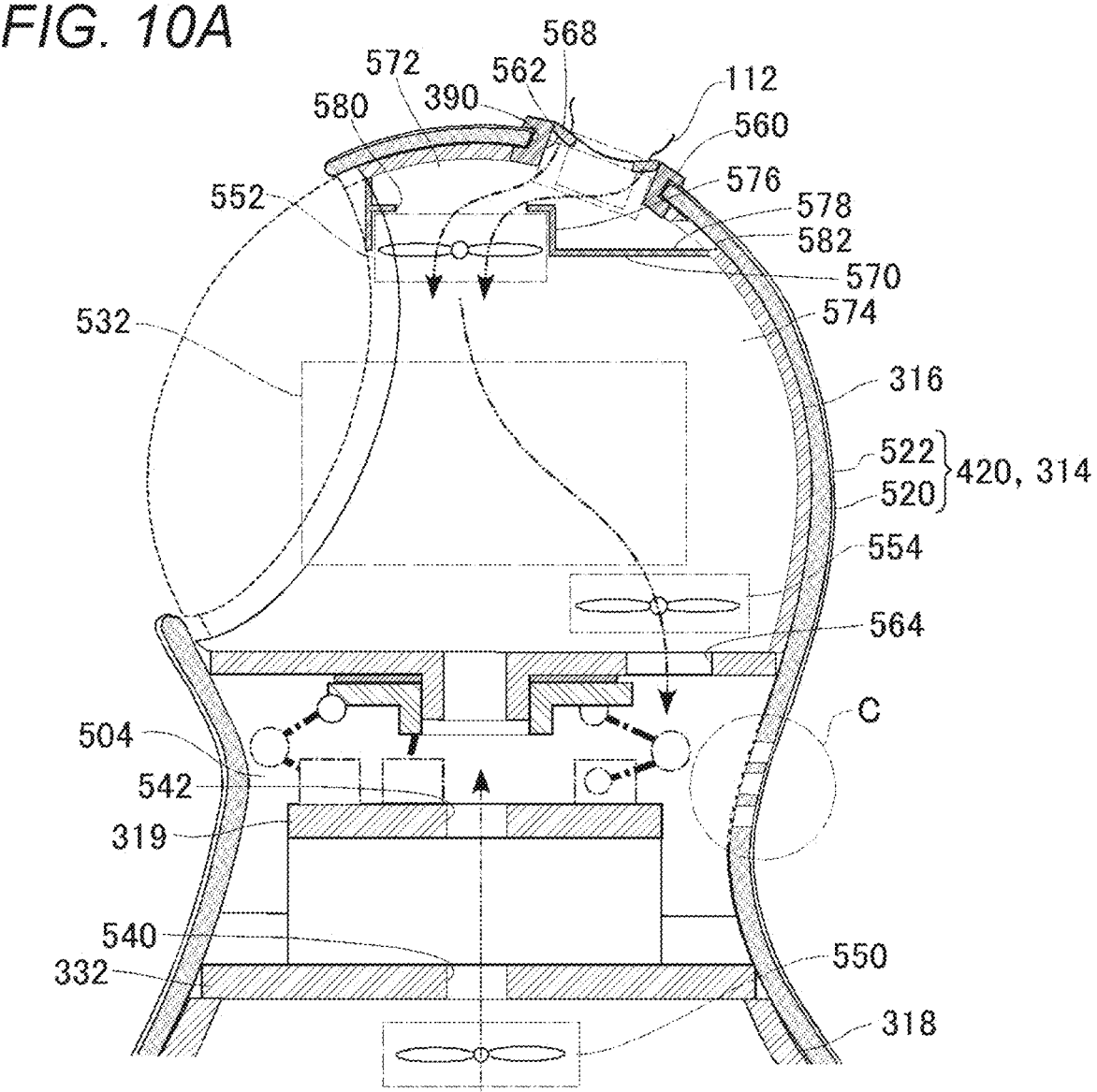
FIG. 10A is a sectional view representing details of a ventilation structure of the robot, and is a sectional view of an upper half portion of the robot seen from a side.
Figure 10B:
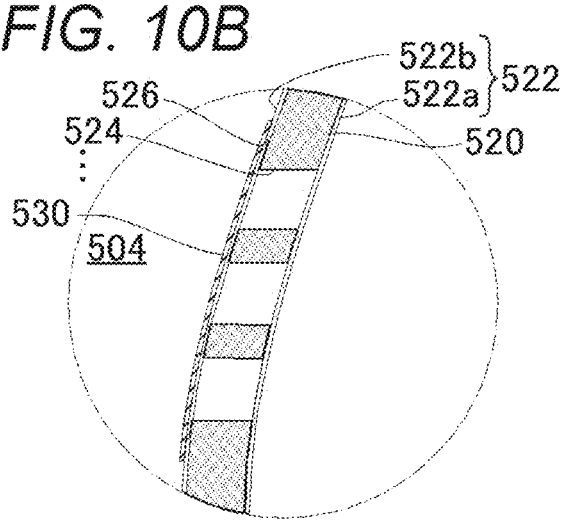
FIG. 10B is a partial enlarged view of a portion C of FIG. 10A, and shows a low ventilation resistance region in an aspect wherein a fan is stopped.
Figure 10C:
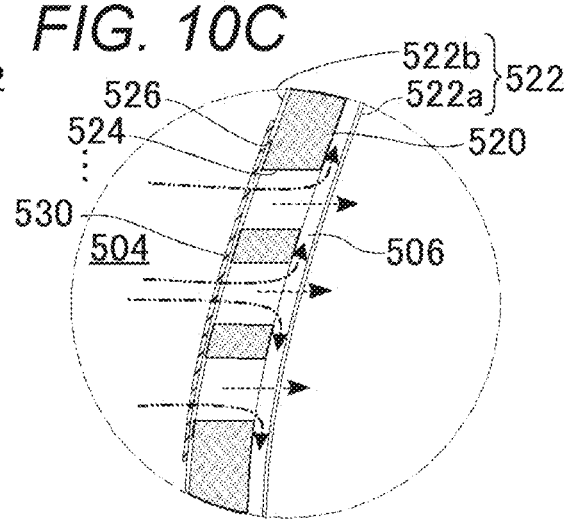
FIG. 10C is a partial enlarged view of the portion C of FIG. 10A, and shows the low ventilation resistance region in an aspect wherein the fan is driven.

FIGS. 10A to 10C are sectional views representing details of a ventilation structure of the robot 100. FIG. 10A is a sectional view of an upper half portion of the robot 100 seen from a side. FIGS. 10B and 10C are enlarged views of a portion C of FIG. 10A, and show a low ventilation resistance region. FIG. 10B shows a state wherein the fans are stopped, and FIG. 10C shows a state wherein the fans are driven.

As shown in FIG. 10A, a guide 560 is provided in an apex portion of the head portion frame 316. The guide 560 is of a stepped cylindrical form, and the aperture portion 390 of the outer skin 314 is fitted around an outer peripheral face of the guide 560. The guide 560 supports the horn 112, and is also used for positioning when fixing the outer skin 314. The guide 560 is formed of a resin material having flexibility, and also fulfills a sealing function when installing the horn 112 in the head portion frame 316.

A circular air inlet 562 is provided on an inner side of the guide 560, and an air outlet 564 is provided in a lower portion of the head portion frame 316. A dustproof filter 568 is provided in an entrance of the air inlet 562. A mesh size of the filter 568 is set to be of an extent such that a dustproofing function can be fulfilled without impeding ventilation. A partition 570 is provided in an upper portion inside the head portion frame 316, whereby an external air introduction chamber 572 above the partition 570 and a housing chamber 574 below the partition 570 are delineated. Electrical parts such as the control circuit substrates 532 are housed in the housing chamber 574.

A step 576 is provided in a front half portion of the partition 570, and a portion behind the step 576 is one level lower, forming a groove for drainage (a drainage groove 578). Meanwhile, an aperture portion 580 for ventilation is provided in an upper face of the step 576. A discharge port 582 is provided in a rear of the head portion frame 316. The discharge port 582 communicates with the external air introduction chamber 572. Even when moisture encroaches into the external air introduction chamber 572 from the exterior through the air inlet 562, the moisture can be discharged to the exterior via the drainage groove 578 and the discharge port 582.

The intake fan 552 is disposed immediately below the aperture portion 580 inside the step 576. A lower end aperture portion (the air inlet 562) of the guide 560 is positioned in such a way as to deviate to the rear from the step 576. This means that even supposing that moisture encroaches through the guide 560 from the exterior, the moisture is dropped behind the step 576 rather than being led to the aperture portion 580. That is, the moisture is prevented from encroaching into the housing chamber 574.

The exhaust fan 554 is disposed immediately above the air outlet 564 in the head portion frame 316. Because of this, a ventilation passage is formed between the intake fan 552 and the exhaust fan 554. The control circuit substrate 532 is positioned in the ventilation passage.

The fans 552 and 554 are driven while the robot 100 is operating, and cooling by ventilation is carried out. That is, external air introduced into the external air introduction chamber 572 from the air inlet 562 is introduced into the housing chamber 574 through the aperture portion 580, and cools heat generating parts (electrical parts) such as the control circuit substrates 532. The exhaust fan 554 sends air warmed by a heat exchange caused by the cooling downward as warm air. The air is discharged to the space 504 through the air outlet 564.

While cooling of heat generating parts by ventilation is carried out in each of the head portion frame 316 and the trunk portion frame 318, the body surface of the robot 100 is appropriately warmed by utilizing air warmed by a heat exchange caused by the cooling, as heretofore described.

That is, pressure in the space 504 (also called "internal pressure") is raised by warmed air being continuously introduced into the space 504. As a result of this, a difference between the internal pressure and atmospheric pressure increases (the internal pressure becomes an appropriate positive pressure), and the warmed air is pushed out toward the body surface. At this time, an outer fabric 522a of the fabric bag 522, which has been in close contact with an outer face of the base material 520, is pushed outward (FIGS. 10B and 10C). An inner fabric 522b maintains a state of being in close contact with an inner face of the base material 520. In the present embodiment, the outer fabric 522a functions as a "surface skin". The air outlet 564 and the communication holes 540 and 542 function as "apertures". The exhaust fan 554 functions as a "first fan", and the fan 550 functions as a "second fan". These fans function as a "pressurizing unit".

The warmed air passes through the patch fabric 530 and the communication hole 524 in the low ventilation resistance region. Although one portion of the air passes through the fiber of the outer fabric 522a and is discharged into the atmosphere (refer to dotted line arrows), the discharge is restricted by the ventilation resistance of the outer fabric 522a. That is, a large portion of the air flows into a gap between the base material 520 and the outer fabric 522a, forming the air layer 506 (refer to dashed-double dotted lines). The air layer 506 extends over practically the whole of an outer surface of the outer skin main body 420, and appropriately warms the body surface of the robot 100. As the air in the air layer 506 flows while the fans are being driven, the outer fabric 522a in contact with the air layer 506 is warmed, and stably maintains the temperature of the body surface. The base material 520 having thermal insulation facilitates warm air spreading over practically the whole of the body surface, and facilitates maintaining the temperature of the air layer 506 formed by the warm air. That is, a situation wherein only a periphery of an internal heat source is locally warmed on the body surface of the robot 100 is avoided, and the temperature of the body surface can be rendered practically uniform. Dimensions and a material (elasticity) of the fabric bag 522 are set in such a way that a thickness of the air layer 506 is less than a thickness of the base material 520. This means that even when the fabric bag 522 swells out due to a drive of the fans, a tactile sensation as the outer skin 314 can be maintained.

Heretofore, the robot 100 has been described based on an embodiment. According to the present embodiment, a body surface of a robot can be efficiently warmed by utilizing the essential function of cooling heat generating parts. Because of this, despite being a robot, the robot can cause a user to feel the warmth of life. By warm air being caused to converge in a specific space formed between frames, pressure in the space (internal pressure of the robot) is increased, and the warmed air is pushed out toward an outer skin. Meanwhile, owing to ventilation resistances on an inner side (a low ventilation resistance region) and an outer side (a surface skin) of the outer skin being caused to differ, a warm air layer is formed by air that has flowed out between a frame and the surface skin. That is, a structure that provides a robot with warmth can easily be realized by focusing on a ventilation resistance balance.

The invention not being limited by the heretofore described embodiment and modifications, components can be changed and embodied within a range not departing from the scope of the invention. Various inventions may be formed by combining a multiple of components disclosed in the heretofore described embodiment and modifications as appropriate. Also, some components may be deleted from among all the components shown in the heretofore described embodiment and modifications.

A configuration such that the space 504 is formed between the head portion frame 316 and the trunk portion frame 318, and warm air is caused to be discharged from inside the two frames to the space 504, has been shown as an example in the heretofore described embodiment. In a modification, air may be caused to be discharged to the space 504 from only one of the head portion frame 316 and the trunk portion frame 318. For example, air may be caused to be discharged to the space from only the frame wherein the amount of heat generated by incorporated heat generating parts is greater. Or conversely, air may be caused to be discharged to the space from only the frame wherein the amount of heat, generated by incorporated heat generating parts is smaller. A configuration may be such that cooling in the frame wherein the amount of heat generated is greater is prioritized, and air after a heat exchange is proactively caused to be discharged to the exterior.

A configuration such that the space 504 is formed between the head portion frame 316 and the trunk portion frame 318, and warm air is caused to converge, has been shown as an example in the heretofore described embodiment. When there is an arm portion frame, a space between the arm portion frame and a trunk portion frame may be covered by a surface skin, and warm air after a heat exchange may be introduced into the space between the arm portion frame and the trunk portion frame. That is, a region in which warm air is caused to converge in a robot can be selected as appropriate. A robot includes a first frame that forms a framework of a first region and a second frame that forms a framework of a second region, and is configured in such a way that warm air converges in a space between the first frame and the second frame. By air in the space being pressurized, the air in the space flows out between each frame and a surface skin, and an air layer is formed between each frame and the surface skin. When an outer skin is configured of a base material and the surface skin, a low ventilation resistance region is provided in a portion exposed in the space.

Electrical parts (heat generating parts) involved in a drive of the robot 100, such as circuit substrates and actuators housed in the main body frame 310, have been shown as an example of a "heat source" in the heretofore described embodiment. In a modification, a heat generating body for warming air, such as a heating wire, may be prepared separately and employed as a "heat source". In the heretofore described embodiment, a heat source is disposed in the interior of each of the head portion frame 316 and the trunk portion frame 318 (inside each frame), but a hear, source may also be disposed in the space 504 (the inter-frame space) between the head portion frame 316 and the trunk portion frame 318.

A configuration such that external air is taken into each frame, and air that has passed through a heat source is collected in a space between the frames and pressurizes the space, has been shown as an example in the heretofore described embodiment. That is, a configuration such that a space between frames is a "space enclosed by frames", and is employed as a pressurized region, has been shown as an example. In a modification, an internal space of a frame may be a "space enclosed by a frame". For example, an aperture may be provided in a side wall of a frame, an outer skin (surface skin) caused to be exposed inside the frame, and the inside of the frame employed as a pressurized region. In this case, an internal pressure of the frame rises, because of which there is a possibility that external air cannot be introduced even when an air inlet is provided. Therefore, a pressurizing device (pressurizing unit) that carries out pressurization using a receptacle that stores a high-pressure gas, such as a gas cylinder, may be disposed inside the frame, and pressurization carried out. That is, the inside of the frame is pressurized by gas being released from the gas cylinder at a constant rate of flow. A warm air layer can be formed between the frame and the surface skin by the portion of the outer skin exposed in the aperture being employed as a low ventilation resistance region. By employing this kind of configuration, an aperture portion for taking in external air becomes unnecessary.

A configuration such that there is a heat source inside each frame, and a fluid heated by the heat source is led out into a space between the frames and pressurizes the space, has been shown as an example in the heretofore described embodiment. In a modification, a heat source may be provided in the space between the frames, and the space pressurized. That is, there being a heat source inside each frame need not be a precondition.

An example wherein a base material is housed in a fabric bag formed of a single material, configuring an outer skin, and an outer fabric is caused to function as a "surface skin", has been shown in the heretofore described embodiment. In a modification, an outer fabric and an inner fabric may be formed of mutually differing materials, configuring a fabric bag that includes the two integrally. In this case, the inner fabric may be formed of a material that has greater breathability than the outer fabric, such as a mesh material. By so doing, there is no longer a need to attach a patch fabric by sewing, as in the heretofore described embodiment. Alternatively, the outer fabric may be bonded to an outer face of the base material and the inner fabric may be bonded to an inner face, rather than the outer fabric and the inner fabric being attached by sewing. When a user touches the inner face of the base material infrequently, or when the base material has excellent abrasion resistance, the inner fabric may be emitted. Alternatively, a configuration such that the base material is eliminated, and a frame is covered by one or a multiple of surface skins, may be adopted. In this case, the surface skin may be formed of a fabric material. In this case, there is a resultant reduction in cost.

Although an example wherein a communication hole provided in a low ventilation resistance region of a base material is a circular hole has been shown in the heretofore described embodiment, a form of the communication hole is not limited to this. A sectional form of the communication hole may be a polygonal form, or may be various forms such as a Y-form, a V-form, or an X-form. Note that the sectional form of the communication hole is preferably a form such that a local stress concentration caused by the base material being deformed when the robot 100 operates is unlikely to occur.

An aspect wherein a discharge of warmed air to the atmosphere depends on the ventilation structure (gaps in the fiber) of the outer fabric 522a itself has been shown as an example in the heretofore described embodiment. This kind of aspect is such that when ventilation resistance becomes excessive, warmed air remains in the robot 100, and there is a possibility that a cooling of heat generating parts, which is the original function, will be impeded. Also, there is a possibility of a high temperature that exceeds the object of conveying the warmth of the robot 100 being reached, and actually inflicting an unpleasant sensation on a user. Therefore, the ventilation resistance of the outer fabric 522a is preferably a resistance that accords with the difference between internal pressure and atmospheric pressure, a flow resistance of air forming an air layer, an external air temperature, and the like. In other words, the outer fabric 522a is preferably configured of a material such that an appropriate ventilation resistance is obtained. It is good when the material is selected so that an air layer temperature reaches a predetermined temperature (for example, 30° C. to 40° C.) owing to the ventilation resistance. A fan drive load (rotational speed) may be controlled in accordance with the material of the outer fabric (surface skin), or the ventilation resistance thereof, so that the air layer temperature reaches a predetermined temperature (for example, 30° C. to 40° C.) in accordance with the external air temperature or the like.

Rather than a structure that depends only on a ventilation performance of an outer fabric (surface skin) in this way, an air outlet may be further provided as a discharge structure that causes air to leak to the exterior. For example, an air outlet may be provided in a predetermined position (for example, an end portion separated from a low ventilation resistance region) in a region of an outer skin in which an air layer is formed. With the air outlet as an orifice, a configuration may be such that a discharge resistance (pressure loss) of an extent such that an air layer can be secured at least while a fan is being driven is obtained. Alternatively, a valve that opens and closes a discharge port may be provided. A rise in internal pressure, and by extension a temperature rise inside a frame, can be restricted by employing a switching valve that opens when an air layer pressure exceeds a set pressure.

An example wherein a surface skin of the robot 100 is of a fabric material has been shown in the heretofore described embodiment. In a modification, a surface skin may be formed using a soft resin material such as vinyl. When adopting this kind of configuration too, an air layer can be formed between a frame and the surface skin. In this case, ventilation holes (small holes) may be provided in a surface of the resin material in order that an appropriate ventilation resistance is obtained in the surface skin. Alternatively, a discharge port, may be formed in a predetermined place (an end portion or the like) in the resin material.

Although not mentioned in the heretofore described embodiment, a surface skin may have elasticity, and be such that ventilation resistance decreases when the surface skin stretches. Specifically, a material selection may be carried out so that an outer fabric swells out owing to an internal pressure being increased by a pressurizing unit, and gaps (air holes) in the fiber of the outer fabric widen appropriately.

Although not mentioned in the heretofore described embodiment, a configuration may be such that an amount of air auctioned by an action of a pressurizing unit is greater than an amount of discharged air leaked from a surface skin.

An example wherein an outer surface heat retaining structure provided by a formation of the heretofore described air layer is embodied in a robot has been shown in the heretofore described embodiment, but not being limited to a robot, the structure is applicable provided that a user can feel warmth by touching. For example, the structure is also applicable to a toy, a stuffed doll, a portable body warmer, a heated table, or a futon (hereafter collectively called a "heat retaining device"). This kind of heat retaining device can be expressed as follows.

This heat retaining device includes a main body, a surface skin that covers the main body, an aperture provided in the main body, a heat source that heats air inside the main body, and a pressurizing unit that, by pressurizing a space enclosed by the main body, forms an air layer between the main body and the surface skin using air that has flowed out from the aperture. According to this aspect, the heat retaining device can be provided with an appropriate warmth, and a user can be provided with a feeling of comfort.

Also, a gas other than air, water, or another fluid may be used as a medium caused to flow via a heat exchange for heat retention. This heat retaining device includes a main body, a surface skin that covers the main body, an aperture provided in the main body, a heat source that heats a fluid inside the main body, and a pressurizing unit that, by pressurizing a space enclosed by the main body, forms a heat retaining medium layer (a fluid layer) between the main body and the surface skin using a fluid that has flowed out from the aperture. When an outer skin is formed by a base material being housed in a bag-form member, a portion farther to an outer side than the base material configures the surface skin. A low passage resistance region whose fluid passage resistance is lower than that of the outer side portion is provided in a portion of the bag-form member farther to an inner side than the base material.

"Passage resistance" means resistance encountered when a fluid passes through a hole included in a member (this may be a small hole formed by a gap in a fiber, or the like), and means ventilation resistance when the fluid is air. That is, "passage resistance" may include concepts of ventilation resistance, flow resistance, circulation resistance, and the like. "Low passage resistance region" may include concepts of low ventilation resistance region, low flow resistance region, low circulation resistance region, and the like. The smaller the passage resistance, the smaller the pressure loss when a fluid passes through.

The present application claims priority based on Japanese Patent Application 2019-27070, submitted on Feb. 19, 2019, which is incorporated herein in its entirety.

What is claimed is:

1. A robot, comprising:
   a frame;
   a surface skin for covering the frame, wherein the surface skin comprises:
      a base material, and
      a fabric housing the base material;
   a pressurizer configured to pressurize a space enclosed by the frame and to force a heated fluid from the space to a fluid layer between the base material and an outer most surface of the fabric.

2. The robot according to claim 1, wherein the surface skin is removable from the frame.

3. The robot according to claim 1, further comprising a discharge structure configured to discharge the heated fluid in the fluid layer to an exterior of the robot.

4. The robot according to claim 3, wherein the discharge structure includes a gap in a fiber of the fabric.

5. The robot according to claim 1, wherein the base material has a higher elasticity than the fabric.

6. The robot according to claim 1, wherein the base material includes a communication hole configured to permit the heated fluid to flow from the space to the fluid layer.

7. The robot according to claim 1, wherein the fabric comprises a low passage resistance region having a lower fluid passage resistance than that of another portion of the fabric, wherein the low passage resistance region is closer to the frame than the base material.

8. The robot according to claim 1, wherein the base material has thermal insulation.

9. The robot according to claim 1, wherein the base material and the outer most surface of the fabric are in direct contact when the space is not pressurized.

10. The robot according to claim 1, wherein the base material includes a material configured to release a self-extinguishing gas when a temperature equal to or greater than a predetermined temperature threshold is reached.

11. The robot according to claim 1, wherein the pressurizer is configured to pressurize the space by forcing external air into an interior of the frame.

12. The robot according to claim 1, further comprising a heater, wherein the heater is configured to heat the heated fluid, and the heater comprises an electrical part is configured to generate heat.

13. The robot according to claim 1, wherein the heated fluid comprises air.

14. The robot according to claim 1, further comprising a heat source configured to heat the heated fluid, wherein the pressurizer is between the fluid layer and the heat source, and the pressurizer includes a fan configured to blow the heated fluid to the fluid layer.

15. The robot according to claim 7, wherein the base material includes a mesh material for covering the low passage resistance region, and a mesh size of the mesh material is larger than a hole of the outer skin and smaller than the communication hole.

16. The robot according to claim 1, wherein the fluid layer is enlarged by the heated fluid flowing out of the space pressurized by the pressurizer.

17. The robot according to claim 1, wherein the fluid layer exists when the heated fluid is not pressurized.

18. A robot, comprising:
   a head frame portion;
   a trunk frame portion connected to the head frame portion;
   a surface skin on each of the head frame portion and the trunk frame portion, wherein the surface skin covers a space between the head frame portion and the trunk frame portion, and the surface skin comprises:
      a base material, and
      a fabric housing the base material;
   a first heat source in the head portion frame;
   a first fan in a ventilation passage passing through the first heat source and configured to send a first fluid warmed by the first heat source to the space;
   a second heat source in the trunk portion frame; and
   a second fan in a ventilation passage passing through the second heat source and configured to send a second fluid warmed by the second heat source to the space; wherein
   a fluid layer is defined between an outer most surface of the fabric and the base material for each of the head frame portion and the trunk frame portion for receiving each of the first fluid and the second fluid.

19. The robot according to claim 18, wherein the first fan is configured to send the first fluid to the space in a first direction, and the second fan is configured to send the second fluid to the space in a second direction which is different from the first direction.

20. An outer skin that is attachable to and removable from a robot to cover a head frame portion and a trunk frame portion, the outer skin comprising:
   a base material having thermal insulation; and
   a fabric material that covers at least an outer surface of the base material, wherein
   the base material includes a communication hole configured to place a space between the head frame portion and the trunk frame portion in fluid communication with a gap between the base material and the fabric material, and the base material has a higher elasticity than the fabric material.

21. A robot, comprising:
   a frame;
   a surface skin for covering the frame, wherein the surface skin comprises:
      a base material,
      a fabric, wherein the base material is between the fabric and the frame, and
      a low passage resistance region between the frame and the base material;
   a pressurizer configured to pressurize a space enclosed by the frame and to force a heated fluid from the space to a fluid layer between the base material and an outer most surface of the fabric, wherein a resistance to passage of the heated fluid through the low passage resistance region is less than a resistance to passage of the heated fluid through the base material.

* * * * *